United States Patent
Tonnerre et al.

(10) Patent No.: US 11,582,672 B2
(45) Date of Patent: Feb. 14, 2023

(54) DYNAMIC ROAMING FOR AIRCRAFT DATA TRAFFIC CONNECTIVITY BETWEEN COMMUNICATION NETWORKS BASED ON PERFORMANCE MEASUREMENTS

(71) Applicant: Thales Avionics, Inc., Irvine, CA (US)

(72) Inventors: Arnaud Tonnerre, Rockledge, FL (US); Yann Nicolas, Irvine, CA (US); Sunil Panthi, Melbourne, FL (US)

(73) Assignee: Thales Avionics, Inc., Irvine, CA (US)

( * ) Notice: Subject to any disclaimer, the term of this patent is extended or adjusted under 35 U.S.C. 154(b) by 73 days.

(21) Appl. No.: 17/323,692

(22) Filed: May 18, 2021

(65) Prior Publication Data

US 2022/0377640 A1 Nov. 24, 2022

(51) Int. Cl.
*H04W 36/32* (2009.01)
*H04W 36/10* (2009.01)
*H04W 16/28* (2009.01)
*H04W 40/36* (2009.01)
*H04W 84/06* (2009.01)

(52) U.S. Cl.
CPC .......... *H04W 36/32* (2013.01); *H04W 16/28* (2013.01); *H04W 36/10* (2013.01); *H04W 40/36* (2013.01); *H04W 84/06* (2013.01)

(58) Field of Classification Search
CPC ..... H04W 36/32; H04W 16/28; H04W 36/10; H04W 40/36; H04W 84/06
See application file for complete search history.

(56) References Cited

U.S. PATENT DOCUMENTS

| | | | |
|---|---|---|---|
| 6,157,834 A * | 12/2000 | Helm | H04B 7/18563 455/12.1 |
| 9,848,433 B2 | 12/2017 | Frerking et al. | |
| 10,263,690 B2 | 4/2019 | Treesh | |
| 10,574,340 B2 * | 2/2020 | Montsma | H04B 7/1858 |
| 11,190,268 B2 * | 11/2021 | Lindqvist | H04B 7/18517 |
| 2006/0030311 A1 * | 2/2006 | Cruz | H01Q 1/32 455/12.1 |

(Continued)

OTHER PUBLICATIONS

International Search Report and Written Opinion of the International Searching Authority for PCT Application No. PCT/US22/28478 dated Aug. 3, 2022.

*Primary Examiner* — Tejis Daya
(74) *Attorney, Agent, or Firm* — Sage Patent Group

(57) ABSTRACT

A broadband communication system provides broadband communication services onboard an aircraft. The broadband communication system includes a satellite communication transceiver, a direct air-to-ground communication (DA2GC) transceiver, and a controller. The satellite communication transceiver is configured to communicate directly with a target satellite providing a satellite communication data pathway with a satellite ground station connected to ground networks. The DA2GC transceiver is configured to communicate directly with a DA2GC ground station providing an DA2GC data pathway with the ground networks. The controller is configured to control handoff between the satellite communication transceiver and the DA2GC transceiver for data communications between the broadband communications system and the ground networks, based on performance of at least one of the satellite communication data pathway and the DA2GC data pathway.

23 Claims, 10 Drawing Sheets

(56) References Cited

U.S. PATENT DOCUMENTS

| | | | |
|---|---|---|---|
| 2015/0109181 A1 | 4/2015 | Hyde et al. | |
| 2016/0119938 A1* | 4/2016 | Frerking | H04B 7/18508 |
| | | | 370/316 |
| 2017/0230104 A1* | 8/2017 | Purkayastha | H04B 7/2041 |
| 2018/0166779 A1 | 6/2018 | Feria et al. | |
| 2018/0167644 A1* | 6/2018 | Frisco | H04N 21/2665 |
| 2020/0162150 A1* | 5/2020 | Montsma | H04B 7/18541 |
| 2020/0259896 A1* | 8/2020 | Sachs | H04L 63/0428 |

* cited by examiner

DYNAMIC ROAMING FOR AIRCRAFT DATA TRAFFIC CONNECTIVITY BETWEEN COMMUNICATION NETWORKS BASED ON PERFORMANCE MEASUREMENTS

FIELD

The present disclosure relates to aeronautical broadband communication systems including satellite communication systems for aircraft.

BACKGROUND

Increasingly, passengers on commercial aircraft desire broadband network access while in-flight. Passenger aircraft may receive network access service via a shared communication link such as a satellite communications link. The aircraft may have an on-board multi-user access terminal that communicates with ground stations (e.g., via a satellite of a satellite communication system or a direct air-to-ground communication (DA2GC) system) and provides network access connectivity for the passengers. For example, users may connect their communication devices (e.g., smartphones, laptops, tablets, etc.) to a wireless local area network (WLAN) served by the multi-user access terminal, which routes data communications to other networks (e.g., the Internet) via the shared communication link. The satellite communications system may be a multi-beam satellite system and the shared communication link may use resources of a satellite beam for the shared communication link. While the resources of each satellite beam may be flexibly applied, each aircraft may represent a large number of users, all potentially accessing broadband content concurrently. Increasing bandwidth for wireless communications systems is expensive and sometimes additional usable spectrum is unavailable. An aircraft within the coverage area of a satellite beam may have a large impact on the utilization of network resources within the beam, and in some instances particular beams of a satellite system may become overutilized.

SUMMARY

Various embodiments of the present disclosure are directed to providing broadband communication services for a broadband communication system onboard an aircraft while performing dynamic handoff between one or more satellite communication data pathways and/or a direct air-to-ground communication (DA2GC) data pathway and between different satellite communication data pathways responsive to performance of the various pathways. Providing dynamic handoff can enable improvements in the continuous availability of broadband communication services, increased communication bandwidth, decreased communications latency, selective routing for latency sensitive applications, decreased cost of the communications, and/or other characteristics that can improve passengers' quality of experience.

In some embodiments, a broadband communication system provides broadband communication services onboard an aircraft. The broadband communication system includes one or more satellite communication transceivers and a DA2GC transceiver, and a controller. The satellite communication transceiver is configured to communicate directly with a target satellite providing a satellite communication data pathway with a satellite ground station connected to ground networks. The DA2GC transceiver is configured to communicate directly with a DA2GC ground station providing an DA2GC data pathway with the ground networks. The controller is configured to control handoff between the satellite communication transceiver and the DA2GC transceiver for data communications between the broadband communications system and the ground networks, based on performance of at least one of the satellite communication data pathway and the DA2GC data pathway.

In some further embodiments, the controller is configured to respond to certain performance measurements, application metadata, passenger data, and/or other defined conditions by initiating handoff of data communications between the satellite communication or DA2GC transceivers, by initiating handoff of data communications from the DA2GC transceiver to the satellite communication transceiver, or by commanding the satellite communication transceiver to steer a steerable beam transmitted by a steerable antenna to handoff aircraft data communications between different satellites.

Other broadband communication systems, computer program products, and related methods according to embodiments of the inventive subject matter will be or become apparent to one with skill in the art upon review of the following drawings and detailed description. It is intended that all such additional broadband communication systems, computer program products, and related methods be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of various present inventive concepts to those skilled in the art. It should also be noted that these embodiments are not mutually exclusive. Components from one embodiment may be tacitly assumed to be present or used in another embodiment.

The present disclosure is directed to providing broadband communication services for aircraft in a more efficient and effective manner based on dynamic performance oriented handoff between satellite communication data pathways and direct air-to-ground communication (DA2GC) data pathways and between satellite communication data pathways.

The tremendous demand for improving broadband communication services for aircraft is driving rapid development of new technologies. Various embodiments of the present disclosure are introduced with reference to FIG. 1, which illustrates a broadband communication system for providing broadband communication services onboard an aircraft in accordance with various embodiments of the present disclosure.

Figure 1:
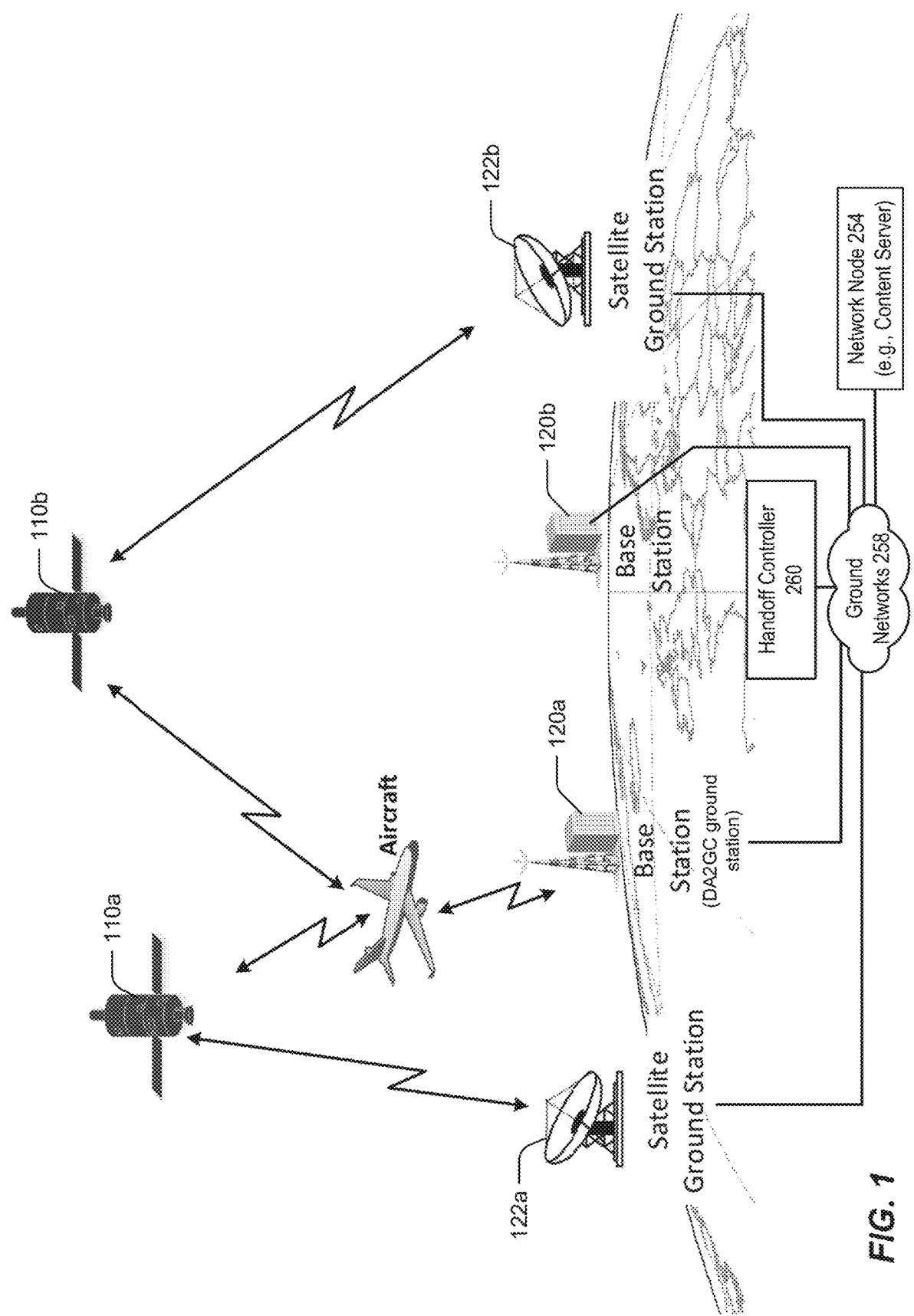
FIG. 1 illustrates a broadband communication system for providing broadband communication services onboard an aircraft in accordance with various embodiments of the present disclosure.

Referring to FIG. 1, an aircraft is configured to use various different pathways for broadband communications with ground data networks 258 through satellite communication systems and DA2GC systems, such as terrestrial mobile systems that can be based on 4G and 5G 3GPP protocols. Wireless access points (WAPs) in the aircraft cabin interconnect passenger electronic devices (PEDs) to aircraft transceivers. For example, passengers may use the broadband communications to browse websites, stream movies, play games, access files, and perform other operations through a network node 254, such as a content server, connected to the ground networks 258.

A satellite communication data pathway can be provided between the aircraft and ground data networks 258. An aircraft satellite communication transceiver connected to a steerable antenna, usually a rotatable antenna array located along a top surface of the fuselage, communicates directly with a target satellite 110a to establish a satellite communication data pathway through a satellite ground station 122a to ground data networks 258. A handoff controller 260 can perform handoff of communications from the target satellite 110a to a secondary satellite 110b, which can be angularly offset from the target satellite 110a, by commanding the satellite communication transceiver to steer the steerable beam transmitted by the steerable antenna to be directed toward the secondary satellite 110b and controlling the transceiver frequencies to be within one or more bands used by the secondary satellite 110b. The example secondary satellite 110b has a communication pathway setup through another satellite ground station 122b to the ground data networks 258. The target satellite 110a, the secondary satellite 110b, and other satellites available for use by the aircraft may be, without limitation, low Earth orbit (LEO) satellites, medium Earth orbit (MEO) satellites, and geosynchronous equatorial orbit (GEO) satellites using, e.g., Ku and Ka frequency bands.

A DA2GC pathway can be provided between the aircraft and the ground data networks 258. An aircraft DA2GC transceiver connected to an antenna, which is generally configured as a fin-shaped antenna located along a bottom surface of the fuselage, communicates directly with a DA2GC ground station 120a (e.g., 4G or 5G radio base station) to establish a DA2GC data pathway with the ground data networks 258. The handoff controller 260 can perform handoff of communications from the target satellite 110a or the secondary satellite 110b to the DA2GC ground station 120a, from the DA2GC ground station 120a to the target satellite 110a or the secondary satellite 110b, and/or from the DA2GC ground station 120a to a secondary DA2GC ground station 120b. For example, the handoff controller 260 can perform handoff of communications from the target satellite 110a to the DA2GC ground station 120a by initiating handoff of data communications from the satellite communication transceiver to the DA2GC transceiver.

Providing Internet and other broadband network connectivity to passengers through satellite communications versus DA2GC involves many tradeoffs that can change over relatively short periods of time. A group of satellites can enable satellite service without limitation of whether the aircraft is over ground or water. In contrast, DA2GC service has more spotty coverage available only while an aircraft remains within a threshold line-of-sight distance of DA2GC ground stations. Data communications through satellite communication data pathways are generally more expensive but may provide higher communication bandwidths than DA2GC data pathways, but many dynamically changing conditions can differently affect the communication efficiency and availability of the pathways. Communication latency through DA2GC data pathways are lower than satellite communication data pathways due to the shorter communication propagation distances.

Embodiments of the present disclosure are directed to operations by the handover controller 260 to provide dynamic performance oriented handoff between satellite communication data pathways and direct air-to-ground communication (DA2GC) data pathways and between satellite communication data pathways. Although the handoff controller 260 is illustrated in FIG. 1 as being located on the ground, in other embodiments some or all of the operations described herein as being performed by a handoff controller (e.g., 310 in FIG. 3) that is located on an aircraft. These operations may be performed by a combination of an aircraft-based handoff controller (e.g., 310 in FIG. 3) and ground-based handoff controller (e.g., 260 in FIGS. 1 and 3).

In some embodiments, the handoff controller 260 is configured to control handoff between the satellite communication transceiver and the DA2GC transceiver for data communications between the broadband communications system onboard the aircraft and the ground networks 258, based on performance of at least one of the satellite communication data pathway and the DA2GC data pathway.

In an example embodiment, the handoff controller 260 initiates handoff from the satellite communication transceiver of the aircraft to the DA2GC transceiver of the aircraft based on the measurements of performance satisfying a satellite to DA2GC data pathway handoff rule. The operations include communicating a roaming request to the network node 254 connected to the ground networks 258 to initiate routing of data communications to the DA2GC transceiver of the aircraft through the DA2GC ground station 120a and to initiate termination of routing of data communications to the satellite communication transceiver of the aircraft through the satellite ground station 122a. The handoff controller 260 can be further configured to initiate handoff from the DA2GC transceiver to the satellite communication transceiver based on the measurements of performance satisfying a DA2GC to satellite data pathway handoff rule. The operations include communicating another roaming request to the network node 254 connected to the ground networks 258 to initiate routing of data communications to the satellite communication transceiver of the aircraft through the satellite ground station 122a and to initiate termination of routing of data communications to the DA2GC transceiver of the aircraft through the DA2GC ground station 120a.

Figure 2:
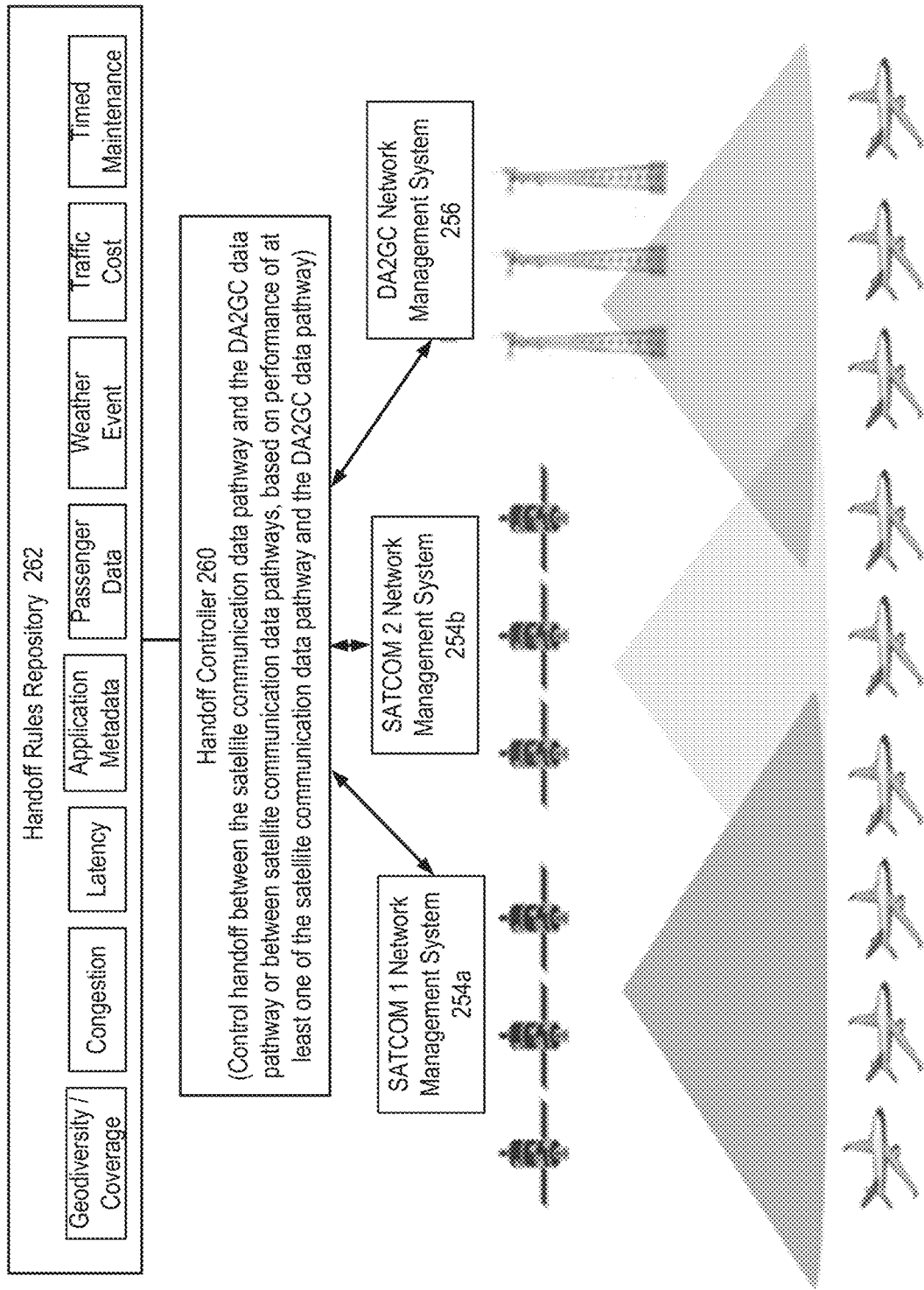
FIG. 2 illustrates a block diagram of components of a broadband communication system that includes a listing of example rules which can be used by the handoff controller to control handoff in accordance with some embodiments of the present disclosure.

FIG. 2 illustrates a block diagram of components of a broadband communication system that includes a listing of example rules which can be used by the handoff controller to control handoff in accordance with some embodiments of the present disclosure.

Referring to FIG. 2, the handoff controller 260 accesses a handoff rules repository 262 to control handoff between the example satellite communication (SATCOM) 1 network management system 254a or SATCOM 2 network management system 254b and the DA2GC network management system 256, and to control handoff between the SATCOM 1 and SATCOM 2 network management systems.

In the illustrated non-limiting example, the handoff controller 260 controls handoff responsive to rules defining geo-diversity locations of satellites and DA2GC transceivers and/or rules defining service coverage areas of satellites and DA2GC transceivers. The rules can access a satellite beam map database which is used to trigger handover near edges of the beams, and can access a DA2GC transceiver cell map database which is similarly used to trigger handover near edges of the cells. As will be explained in further detail below, other rules which may be used by the handoff controller 260 are based on network congestion, communication latency, application metadata, passenger data, weather events, traffic cost, timed maintenance, and/or other defined conditions.

Figure 4A:
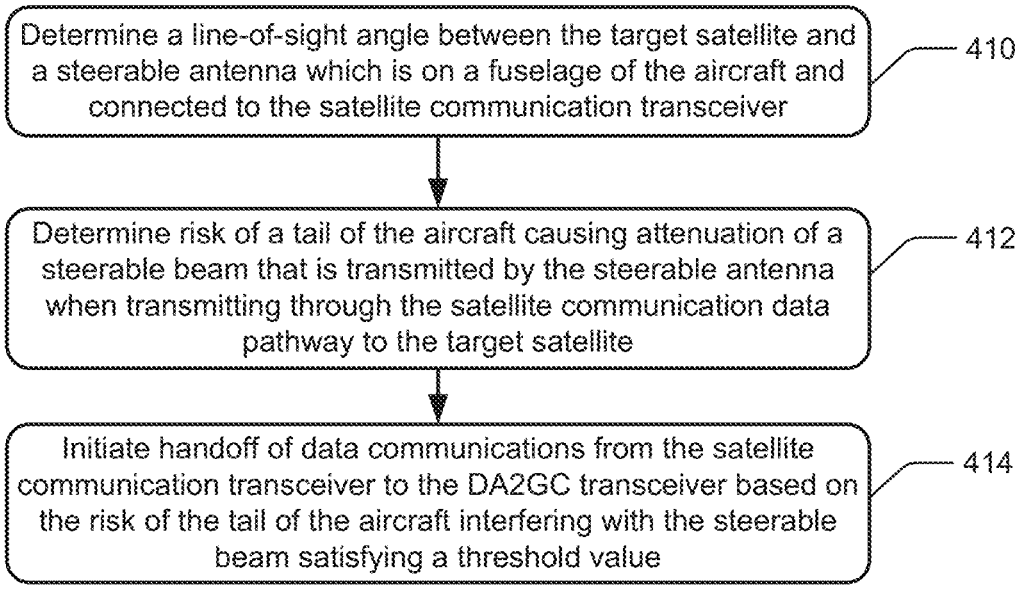
FIGS. 4A, 4B, 5A, 5B, 6, 7A, 7B, 8, 9, 10, 11, 12, 13, and 14 are flowcharts of operations that can be performed by a handoff controller component of a broadband communication system operating in accordance with some embodiments of the present disclosure.

Handoff to Avoid Tail Interference:

In one embodiment, handoff from satellite communications to DA2GC, e.g., from satellite 110a to DA2GC 120a in FIG. 1, is controlled based on an determination of risk of a tail of the aircraft causing attenuation of a presently established or soon-to-be established satellite communication data pathway between the aircraft and a satellite. FIG. 4A illustrates a flowchart of corresponding operations that can be performed by the handoff controller 260. Referring to FIG. 4A, the operations determine 410 a line-of-sight angle between the target satellite and a steerable antenna which is on a fuselage of the aircraft and connected to the satellite communication transceiver. The operations determine 412 based on the line-of-sight angle a risk of a tail of the aircraft causing attenuation of a steerable beam that is transmitted by the steerable antenna when transmitting through the satellite communication data pathway to the target satellite. The operations initiate handoff 414 of data communications from the satellite communication transceiver to the DA2GC transceiver based on the risk of the tail of the aircraft interfering with the steerable beam satisfying a threshold value.

In a further embodiment, the threshold value is defined based on latency between initiating and completing handoff of data communications from the satellite communication transceiver to the DA2GC transceiver.

Figure 4B:
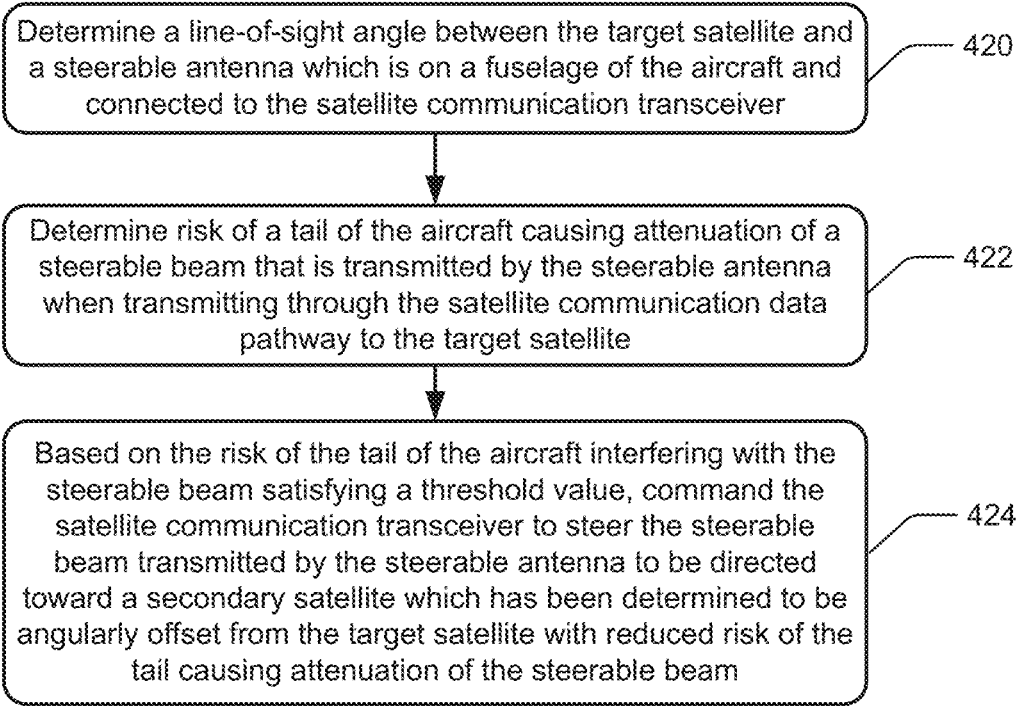

In another embodiment, handoff between different satellites, e.g., from a satellite 110a to a secondary satellite 110b in FIG. 1, is controlled based on an determination of risk of a tail of the aircraft causing attenuation of a presently established or soon-to-be established satellite communication data pathway between the aircraft and a satellite. FIG. 4B illustrates a flowchart of corresponding operations that can be performed by the handoff controller 260. Referring to FIG. 4B, the operations determine 420 a line-of-sight angle between a target satellite, e.g., 110a in FIG. 1, and a steerable antenna which is on a fuselage of the aircraft and connected to the satellite communication transceiver. The operations determine 422 based on the line-of-sight angle a risk of a tail of the aircraft causing attenuation of a steerable beam that is transmitted by the steerable antenna along the satellite communication data pathway to the target satellite. Based on the risk of the tail of the aircraft interfering with the steerable beam satisfying a threshold value, the operations command 424 the satellite communication transceiver to steer the steerable beam transmitted by the steerable antenna to be directed toward a secondary satellite, e.g., 110b in FIG. 1, which has been determined to be angularly offset from the target satellite with reduced risk of the tail causing attenuation of the steerable beam.

In a further embodiment, the threshold value is defined based on latency between initiating and completing handoff of data communications from the satellite to the transceiver to the secondary satellite.

Figure 5A:
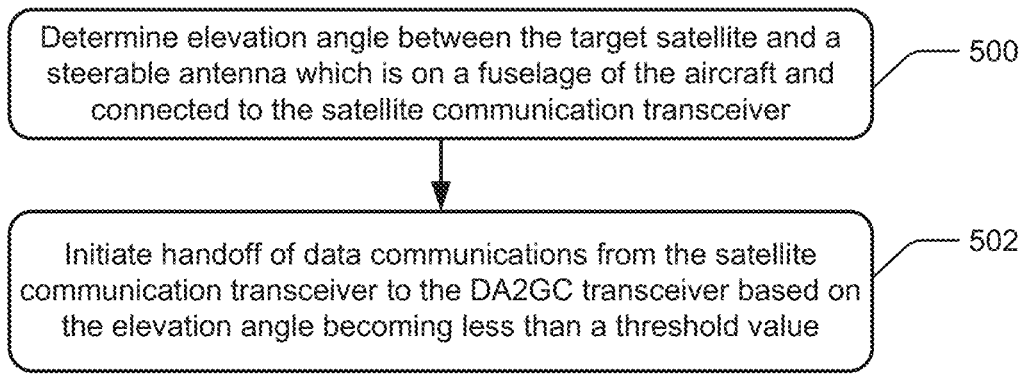

Handoff Based on Elevation Angle:

In another embodiment, handoff from satellite communications to DA2GC, e.g., from satellite 110a to DA2GC 120a in FIG. 1, is controlled based on an elevation angle between the target satellite and a steerable antenna which is on a fuselage of the aircraft and connected to the satellite communication transceiver. The gain of the antenna at low elevation angle degrades severally due. Handoff based on elevation angle can avoid loss of communications when the elevation angle becomes sufficiently small. FIG. 5A illustrates a flowchart of corresponding operations that can be performed by the handoff controller 260. Referring to FIG. 5A, the operations determine 500 an elevation angle between the target satellite and the steerable antenna. The operations initiate handoff 502 of data communications from the satellite communication transceiver to the DA2GC transceiver based on the elevation angle becoming less than a threshold value.

In a further embodiment, the threshold value is defined based on latency between initiating and completing handoff of data communications from the satellite communication transceiver to the DA2GC transceiver.

Figure 5B:
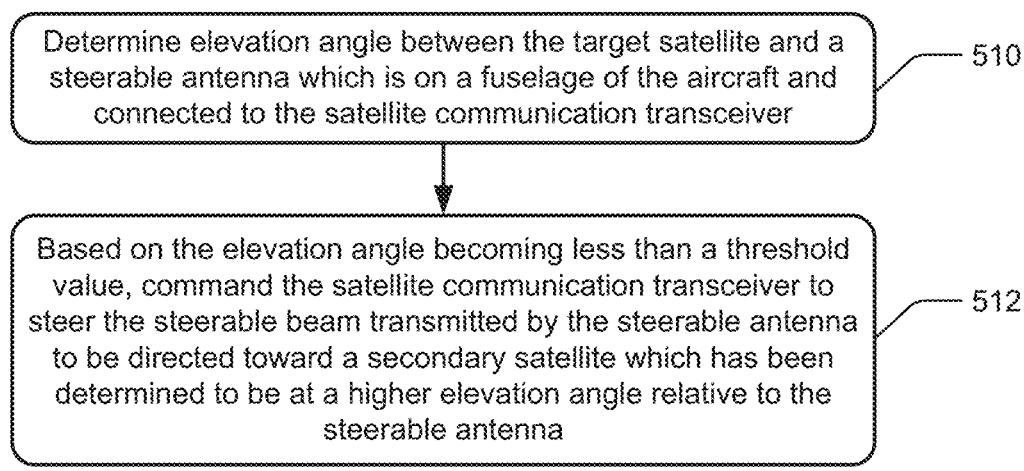

In another embodiment, handoff between different satellites, e.g., from a satellite 110a to a secondary satellite 110b in FIG. 1, is controlled based on an elevation angle between the target satellite and a steerable antenna which is on a fuselage of the aircraft and connected to the satellite communication transceiver. Again, handoff based on elevation angle can avoid loss of communications when the elevation angle becomes sufficiently small where the gain of the antenna at low elevation angle degrades severely, and when the beam can instead be steered to be directed to a clear angularly offset secondary satellite 110b. FIG. 5B illustrates a flowchart of corresponding operations that can be performed by the handoff controller 260. Referring to FIG. 5B, the operations determine 510 an elevation angle between the target satellite and a steerable antenna which is on a fuselage of the aircraft and connected to the satellite communication transceiver. Based on the elevation angle becoming less than a threshold value, the operations command 512 the satellite communication transceiver to steer the steerable beam transmitted by the steerable antenna to be directed toward a secondary satellite which has been determined to be at a higher elevation angle relative to the steerable antenna.

In a further embodiment, the threshold value is defined based on latency between initiating and completing handoff of data communications from the satellite 110a to the secondary satellite 110b.

Figure 6:
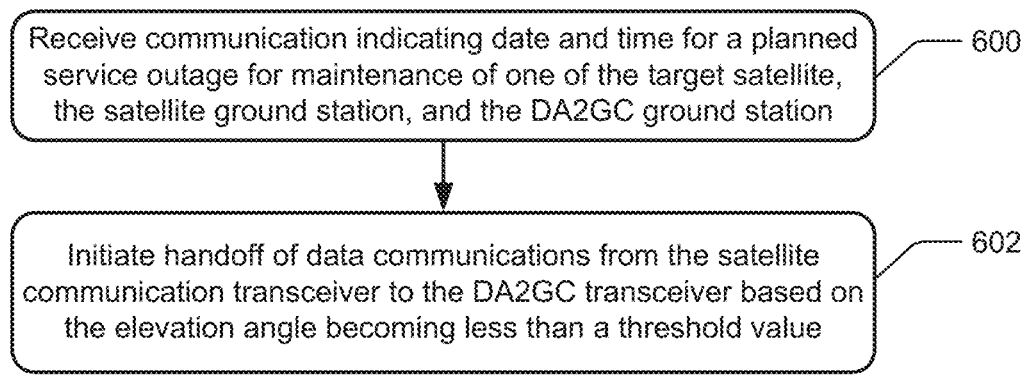

Handoff Based on Planned Service Outage for Maintenance:

Handoff from satellite communications to DA2GC and vice-versa can be controlled based on an planned service outage for maintenance. FIG. 6 illustrates a flowchart of corresponding operations that can be performed by the handoff controller 260. Referring to FIG. 6, the operations receive 600 a communication indicating a date and time for a planned service outage for maintenance of one of the target satellite, the satellite ground station, and the DA2GC ground station. The operations initiate 602 the handoff of data communications between the satellite communication transceiver and the DA2GC transceiver based on the date and time for the data communications to pass through one of the satellite communication data pathway and the DA2GC data pathway while bypassing the one of the target satellite, the satellite ground station, and the DA2GC ground station during the maintenance.

Figure 7A:
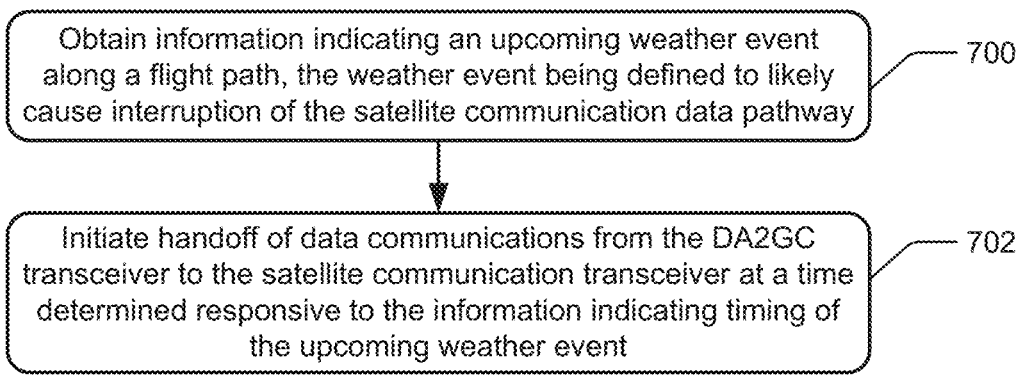

Handoff Based on Weather Event:

While an aircraft is airborne and proximately located to a weather event that interferes with RF communications along a DA2GC data pathway, handoff between from DA2GC to satellite can be controlled based on the weather event. FIG. 7A illustrates a flowchart of corresponding operations that can be performed by the handoff controller 260. Referring to FIG. 7A, the operations obtain 700 information indicating an upcoming weather event along a flight path, where the weather event is defined to likely cause interruption of the DA2GC data pathway. The operations initiate 702 handoff of data communications from the DA2GC transceiver to the satellite communication transceiver at a time determined responsive to the information indicating timing of the upcoming weather event.

While an aircraft is on the ground or flying below a weather event that interferences with RF communications along a satellite data pathway, handoff can be performed from a lower elevation angle satellite to another higher elevation angle satellite relative to the steerable antenna on the aircraft, which results in less atmospheric distance being traversed by the RF signal and corresponding decreased signal attenuation.

Figure 7B:
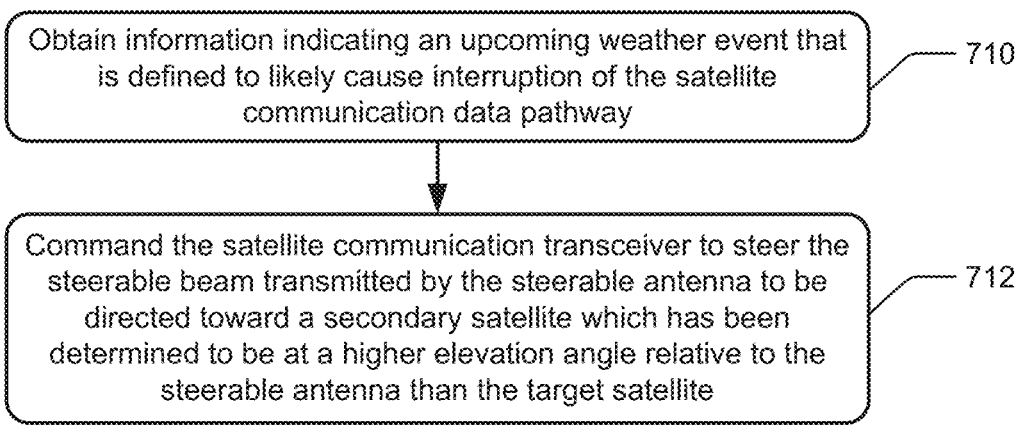

FIG. 7B illustrates a flowchart of corresponding operations that can be performed by the handoff controller 260. Referring to FIG. 7B, the operations obtain 710 information indicating an upcoming weather event that is defined to likely cause interruption of the satellite communication data pathway. The operations command 712 the satellite communication transceiver to steer the steerable beam transmitted by the steerable antenna to be directed toward a secondary satellite which has been determined to be at a higher elevation angle relative to the steerable antenna than the target satellite.

Handoff Based on Link Quality:

Another embodiment is directed to controlling handoff based on link quality of the satellite communication data pathway and/or the DA2GC data pathway, where the link quality can correspond to measurements of packet error rate, bit error rate, etc.

Figure 8:
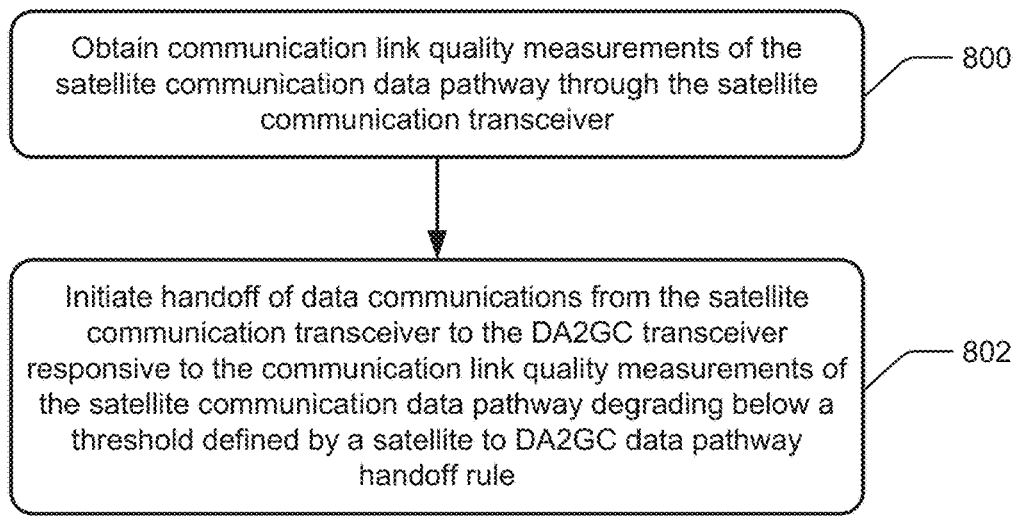

FIG. 8 illustrates a flowchart of corresponding operations that can be performed by the handoff controller 260. Referring to FIG. 8, the operations obtain 800 communication link quality measurements of the satellite communication data pathway through the satellite communication transceiver. The operations initiate 802 handoff of data communications from the satellite communication transceiver to the DA2GC transceiver responsive to the communication link quality measurements of the satellite communication data pathway degrading below a threshold defined by a satellite to DA2GC data pathway handoff rule.

Handoff Based on Network Congestion:

Some other operational embodiments are directed to controlling handoff based on network congestion, such as initiating handoff from satellite communications to DA2GC when the satellite pathway become sufficiently congested to satisfy a handoff rule. Alternatively or additionally, handoff can be initiated from DA2GC to satellite communications when the DA2GC pathway becomes sufficiently congested to satisfy another handoff rule.

Figure 9:
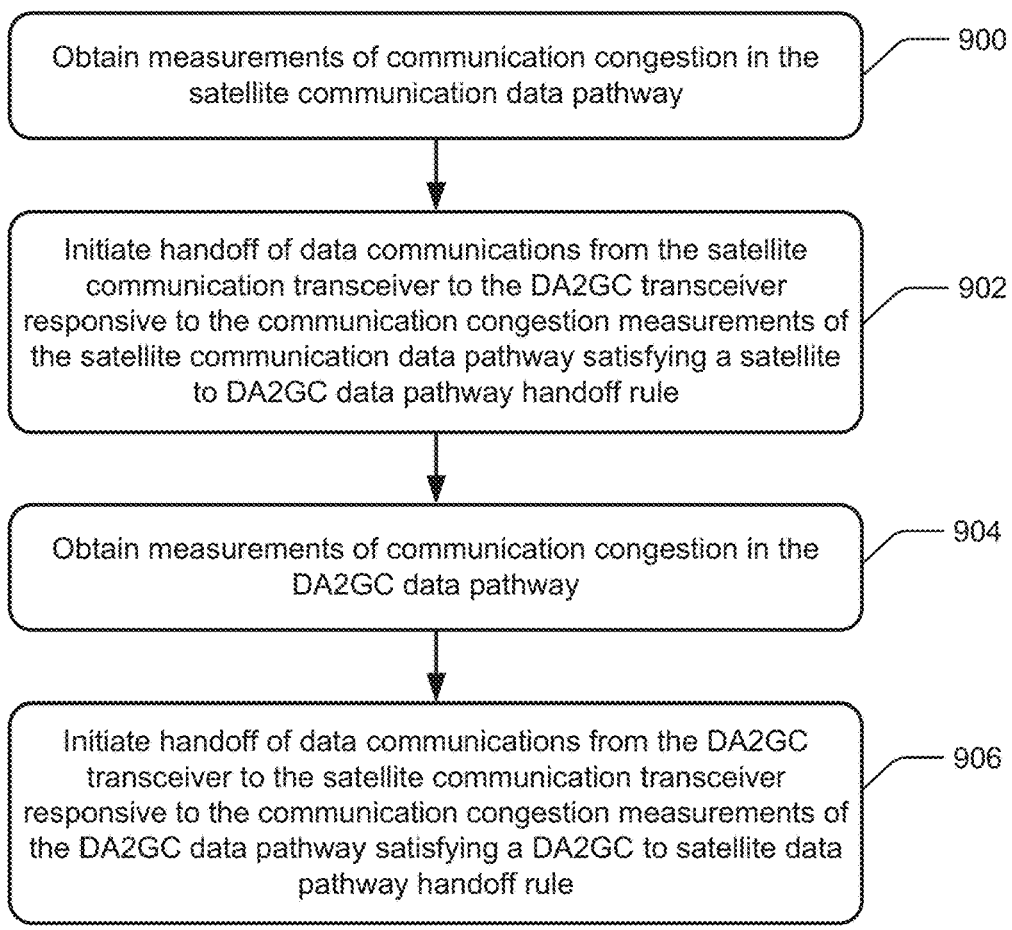

FIG. 9 illustrates a flowchart of corresponding operations that can be performed by the handoff controller 260. Referring to FIG. 9, the operations obtain 900 measurements of communication congestion in the satellite communication data pathway. The operations initiate handoff 902 of data communications from the satellite communication transceiver to the DA2GC transceiver responsive to the communication congestion measurements of the satellite communication data pathway satisfying a satellite to DA2GC data pathway handoff rule.

In an additional or alternative embodiment, the operations obtain 904 measurements of communication congestion in the DA2GC data pathway, and initiate handoff 906 of data communications from the DA2GC transceiver to the satellite communication transceiver responsive to the communication congestion measurements of the DA2GC data pathway satisfying a DA2GC to satellite data pathway handoff rule.

It is noted that before initiating handoff of data communications from the satellite communication transceiver to the DA2GC transceiver (operation 902) and/or before initiating handoff of data communications from the DA2GC transceiver to the satellite communication transceiver (operation 906), the operations can make the handoff contingent on the target handoff communication pathway having less congestion than the present communication pathway. After handoff is performed to the target handoff communication pathway, a further operation can be performed before handoff can be initiated back to the original communication pathway (operation 902 or 906) which uses a hysteresis function to determine how long the present handoff communication pathway has been used relative to a threshold minimum use time, in order to prevent a possible rapid flip flop between communication pathways.

Handoff Based on Communication Latency:

Another operational embodiment is directed to controlling handoff based on communication latency, such as when latency become sufficiently degraded due to congestion, poor quality communications necessitating packet retransmission, and/or propagation delay.

Corresponding operations that can be performed by the handoff controller 260, include obtaining measurements of communication latency in the satellite communication data pathway through the satellite communication transceiver. The operations initiate handoff of data communications from the satellite communication transceiver to the DA2GC transceiver responsive to the communication latency measurements of the satellite communication data pathway satisfying a satellite to DA2GC data pathway handoff rule.

Handoff Based on Latency Sensitivity of Applications Executed by On-Board Devices:

Another operational embodiment is directed to controlling handoff based on latency sensitivity of applications through being executed by at least one electronic device onboard the aircraft, such as a seat video display unit, PED, etc. Handoff may be performed to ensure a threshold quality of experience (QoE) for passengers when using latency sensitive applications on their PEDs while obtaining movie streaming services and/or near real-time interactive games provided by the network node 254.

Figure 10:
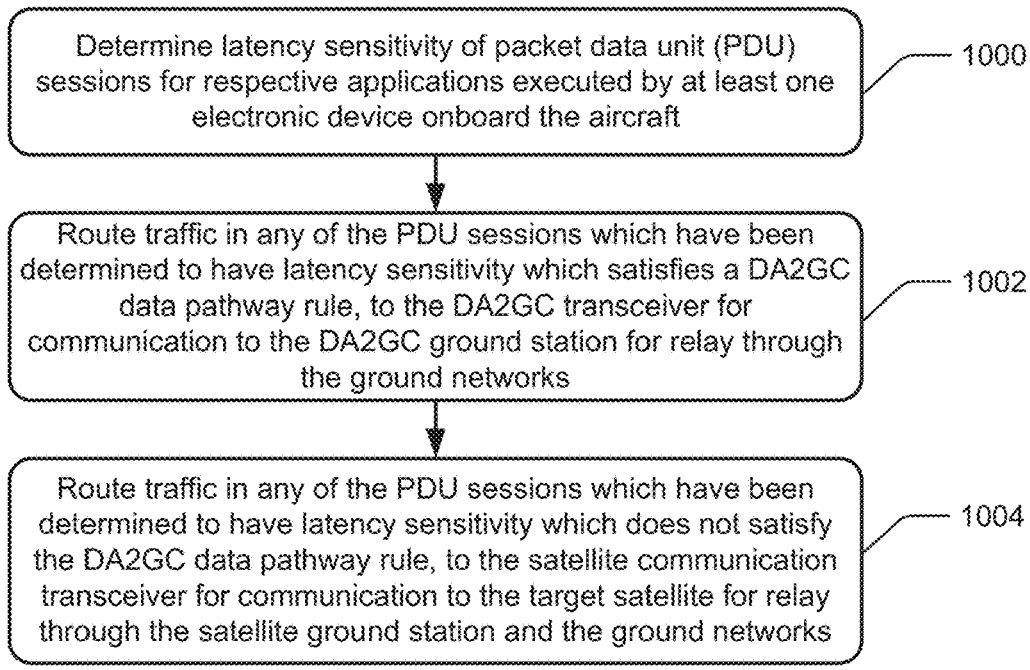

FIG. 10 illustrates a flowchart of corresponding operations that can be performed by the handoff controller 260. Referring to FIG. 10, the operations determine 1000 latency sensitivity of sessions, such as packet data unit (PDU) sessions, for respective applications executed by at least onboard the aircraft. The operations route 1002 traffic in any of the sessions which have been determined to have latency sensitivity which satisfies a DA2GC data pathway rule, to the DA2GC transceiver for communication to the DA2GC ground station for relay through the ground networks. In contrast, the operations route 1004 traffic in any of the sessions which have been determined to have latency sensitivity which does not satisfy the DA2GC data pathway rule, to the satellite communication transceiver for communication to the target satellite for relay through the satellite ground station and the ground networks.

The controller 260 may be configured to determine latency sensitivity of one of the sessions (e.g., 5G 3GPP Protocol Data Unit (PDU) sessions) based on a destination IP address of a data packet sent as traffic through the session. The controller 260 may be configured to determine latency sensitivity of one of the sessions (e.g., PDU sessions) based on a type of traffic being communicated as traffic through the session. The controller 260 may be configured to determine latency sensitivity of one of the sessions (e.g., PDU sessions) based on whether low-latency edge computing at an edge server to the ground-based radio transceiver is to be used.

Handoff Based on Metadata Defined for an Application:

Another operational embodiment is directed to determining whether to route traffic through the satellite pathway or the DA2GC pathway based on metadata defined for an application, where the metadata may identify a preferred routing pathway, a priority, etc.

Figure 11:
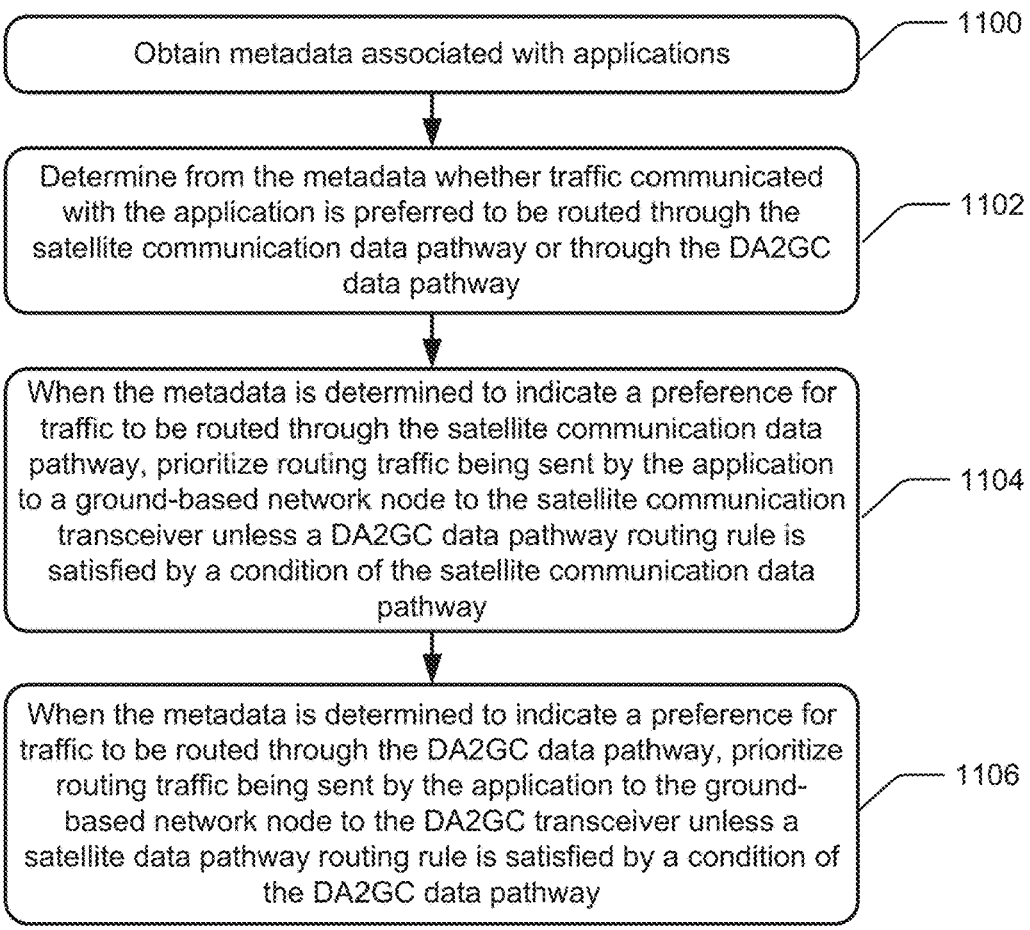

FIG. 11 illustrates a flowchart of corresponding operations that can be performed by the handoff controller 260. Referring to FIG. 11, the operations obtain 1100 metadata associated with applications. The operations determine 1102 from the metadata whether traffic communicated with the application is preferred to be routed through the satellite communication data pathway or through the DA2GC data pathway. When the metadata is determined to indicate a preference for traffic to be routed through the satellite communication data pathway, the operations prioritize 1104 routing traffic being sent by the application to a ground-based network node to the satellite communication transceiver unless a DA2GC data pathway routing rule is satisfied by a condition of the satellite communication data pathway. In contrast, when the metadata is determined to indicate a preference for traffic to be routed through the DA2GC data pathway, the operations prioritize 1106 routing traffic being sent by the application to the ground-based network node to the DA2GC transceiver unless a satellite data pathway routing rule is satisfied by a condition of the DA2GC data pathway.

In a further embodiment, the operation to determine 1102 from the metadata can include determining one of a priority of the application and an indicated pathway preference for traffic sent by the application.

Handoff Based on Passenger Information:

Another operational embodiment is directed to whether to route traffic through the satellite pathway or the DA2GC pathway based on passenger information, such as the passenger's seat class, passenger's frequent flyer status with an airline, passenger's flight itinerary, etc.

Figure 12:
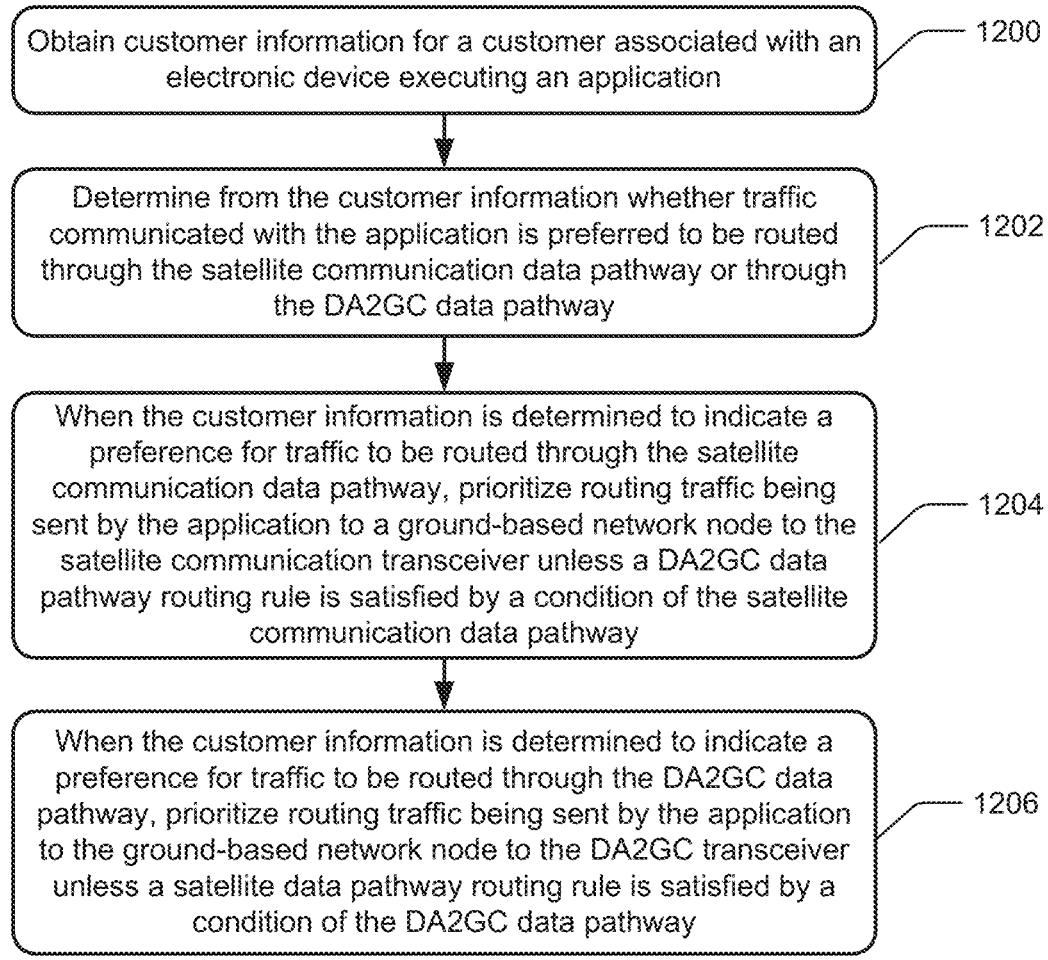

FIG. 12 illustrates a flowchart of corresponding operations that can be performed by the handoff controller 260. Referring to FIG. 12, the operations obtain 1200 customer information for a customer associated with an electronic device executing an application. The operations determine 1202 from the customer information whether traffic communicated with the application is preferred to be routed through the satellite communication data pathway or through the DA2GC data pathway. When the customer information is determined to indicate a preference for traffic to be routed through the satellite communication data pathway, the operations prioritize 1204 routing traffic being sent by the application to a ground-based network node to the satellite communication transceiver unless a DA2GC data pathway routing rule is satisfied by a condition of the satellite communication data pathway. In contrast, when the customer information is determined to indicate a preference for traffic to be routed through the DA2GC data pathway, the operations prioritize 1206 routing traffic being sent by the application to the ground-based network node to the DA2GC transceiver unless a satellite data pathway routing rule is satisfied by a condition of the DA2GC data pathway.

Handoff Based on Cost of the Communication Pathway:

Another operational embodiment is directed to controlling handoff based on cost of the communication pathway, such as the cost per megabyte of data communicated, cost of metered threshold parameters, etc.

Figure 13:
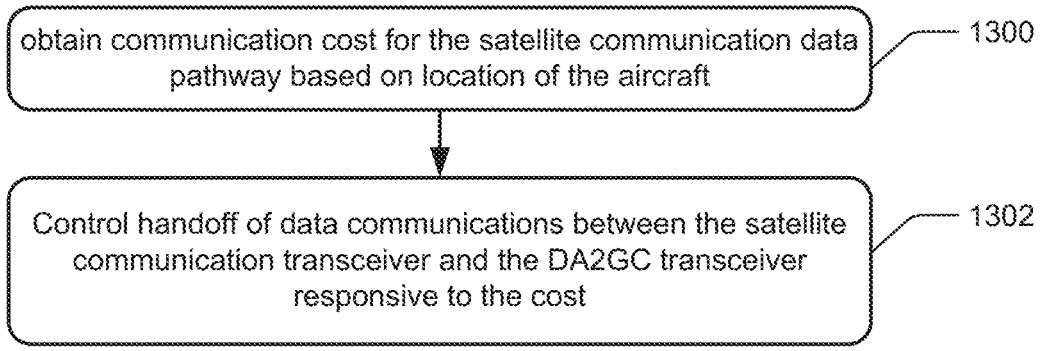

FIG. 13 illustrates a flowchart of corresponding operations that can be performed by the handoff controller 260. Referring to FIG. 13, the operations obtain 1300 communication cost for the satellite communication data pathway based on location of the aircraft. The operations control 1302 handoff of data communications between the satellite communication transceiver and the DA2GC transceiver responsive to the cost. For example, the operations can initiate handoff of data communications from the satellite communication transceiver to the DA2GC transceiver responsive to the communication cost for the satellite communication data pathway satisfying a satellite to DA2GC data pathway handoff rule. The operations can initiate handoff of data communications from the DA2GC transceiver to the satellite communication transceiver responsive to the communication cost for the satellite communication data pathway satisfying a DA2GC to satellite data pathway handoff rule.

Handoff Based on Cost of the Predicted Upcoming Loss of Availability of Data Pathway:

Another operational embodiment is directed to controlling handoff based on a predicted upcoming loss of availability of a communication data pathway for a flight route of the aircraft.

Figure 14:
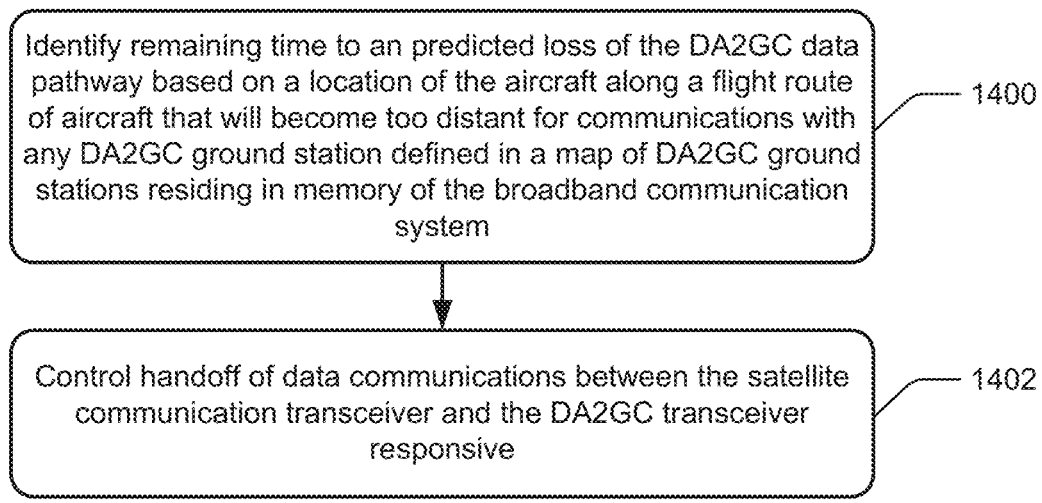

FIG. 14 illustrates a flowchart of corresponding operations that can be performed by the handoff controller 260. Referring to FIG. 14, the operations identify 1400 remaining time to an predicted loss of the DA2GC data pathway based on a location of the aircraft along a flight route of aircraft that will become too distant for communications with any DA2GC ground station defined in a map of DA2GC ground stations residing in memory of the broadband communication system. The operations responsively control 1402 handoff of data communications from the DA2GC transceiver to the satellite communication transceiver at least a threshold time before expiration of the remaining time. The threshold time is defined based on at least a predicted amount of time required to complete operations for the handoff of data communications.

Figure 3:
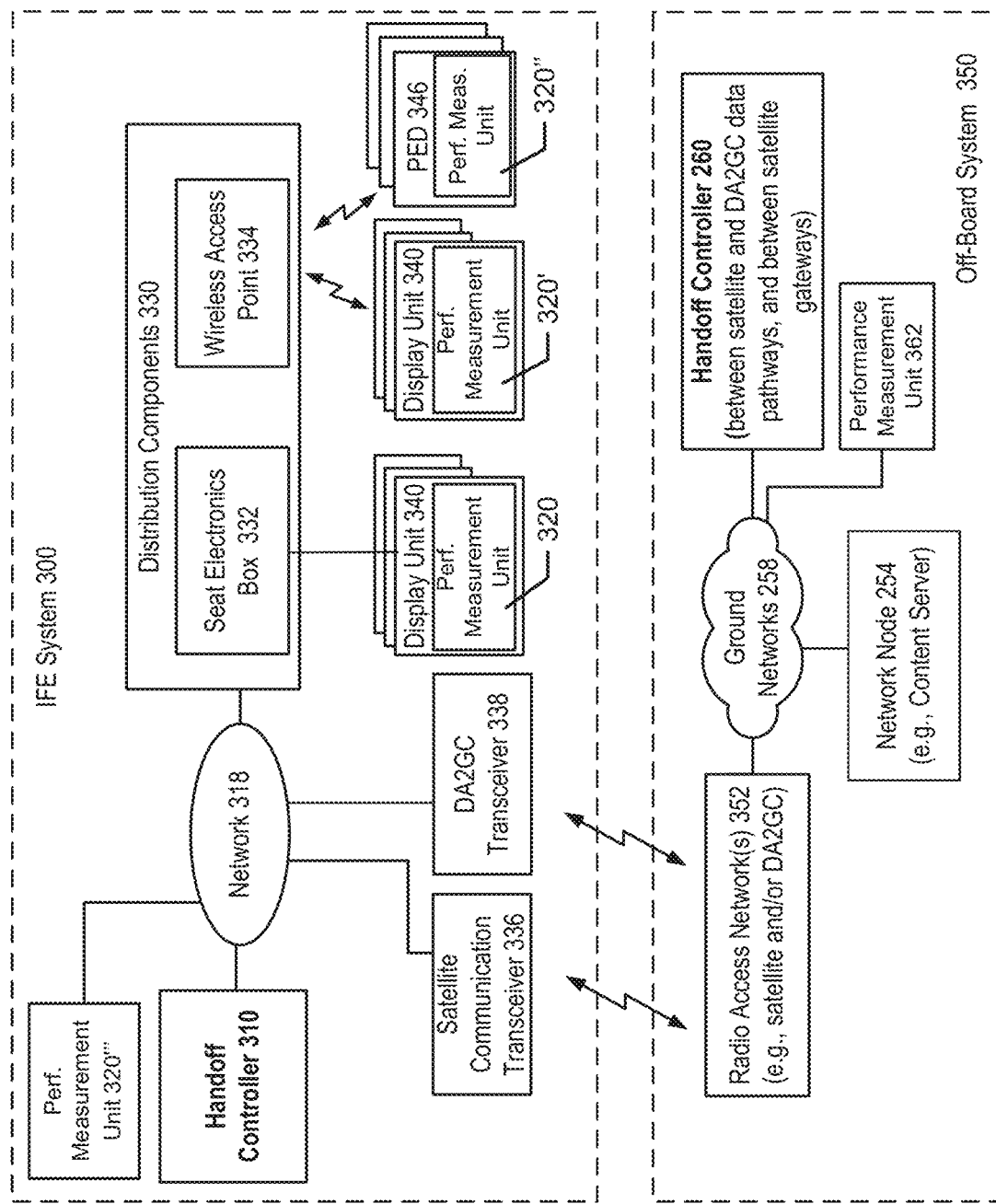
FIG. 3 illustrates a block diagram of some components of an IFE system and an off-board communication system, including satellites and DA2GC ground stations, which are configured to operate in accordance with some embodiments of the present disclosure.

Example IFE System and Off-Board Communication System:

FIG. 3 illustrates a block diagram of some components of an IFE system and an off-board communication system, including satellites and DA2GC ground stations, which are configured to operate in accordance with some embodiments of the present disclosure.

Referring to FIG. 3, the IFE system 300 includes example content delivery devices, such as display units (video display units) 340 and additional content delivery devices, such as data traffic distribution components 330. The distribution components 330 communicatively connect service delivery devices, such as the display units 340 and passenger electronic devices ("PEDs") 346, to other components of the IFE system 300 through wired communication connections provided by seat electronic boxes 332 (e.g., each mounted to a row of seats) and/or through wireless communication connections provided by wireless access points 334 which can be spaced apart along the aircraft cabin. Off-board computer systems, such as a ground-based network node 254 can communicate through ground-based networks 258 (e.g., Internet and/or private networks) and one or more radio access networks (RANs) 352 with the IFE system 300 through a radio network interface. The RAN(s) 352 may communicate with a satellite communication transceiver 336 and a DA2GC transceiver 338 which are part of or connected to the IFE system 330 on board the aircraft. Accordingly, radio communications between the IFE system 300 and the off-board system 350 can be performed through satellite communications and/or DA2GC. Passengers can communicate with the network node 254 through the display units 340 and/or the PEDs 346 to browse websites, stream movies, play games, access files, and perform other operations provided by the network node 254 operating as a content server.

The system 300 can receive IFE content through the satellite communication transceiver 336 and the DA2GC transceiver 338 which can be distributed, under control of a connectivity server (e.g., as part of 320'''), through the network 318 and the distribution components 330 to the display units 340 and/or the PEDs 346 responsive to content selection commands received from the display units 340 and/or the PEDs 346. The distribution components 330 may include additional content delivery devices, such as seat electronics boxes 332, each of which can be spaced apart adjacent to different groups of seats, and/or one or more wireless communication routers 334.

Example content that can be provided to display units 340 and/or PEDs 346 can include, but is not limited to, movies, TV shows, audio programs, application programs (e.g. games, news, etc.), informational videos and/or multimedia/textual descriptions (e.g., news, advertisements, and information related to inflight services, destination cites, destination related services, and products). The wireless router 334 may be a WLAN router (e.g. IEEE 802.11, WIMAX, etc.), a cellular-based network (e.g. a pico cell radio base station), etc.

The display units 340 and/or the PEDs 346 can operate to select among content through wired and/or wireless network connections through the network 318 and/or the distribution components 330. Any number of display units 340 and PEDs 346 may be used with embodiments herein.

In accordance with various embodiments disclosed herein, a handoff controller controls handoff of communication between the satellite communication transceiver 336 and the DA2GC transceiver 338, and may further control handoff of communications between different satellites or clusters of satellites as explained above. A ground-based performance measurement unit 362 and/or an on-board performance measurement unit 320, 320',320",320''' is configured to measure or obtain performance characteristics, which as described above may include, without limitation, network congestion, communication latency, application metadata, passenger data, weather events, traffic cost, timed maintenance, and/or other defined characteristics. The on-board performance measurement unit is not limited to being located in the illustrated equipment and can be located in any equipment transported with the aircraft, such as being located in a connectivity server (e.g., which may also be part of 320'''). In some embodiments, a ground-based handoff controller 260 and/or an on-board handoff controller 310 uses reported performance characteristics from one or more of the units 362, 320, 320',320",320''', etc., to control handoff of communications between different satellites or clusters of satellites as explained above.

Further Definitions and Embodiments:

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

What is claimed is:

1. A broadband communication system for providing broadband communication services onboard an aircraft, the broadband communication system comprising:
   a satellite communication transceiver configured to communicate directly with a target satellite providing a satellite communication data pathway with a satellite ground station connected to ground networks;
   a direct air-to-ground communication (DA2GC) transceiver configured to communicate directly with a DA2GC ground station providing an DA2GC data pathway with the ground networks; and
   a controller configured to control handoff between the satellite communication transceiver and the DA2GC transceiver for data communications between the broadband communications system and the ground networks, based on performance of at least one of the satellite communication data pathway and the DA2GC data pathway,
   wherein the controller is further configured to perform one of the following:
   (A) obtain information indicating an upcoming weather event along a flight path, the weather event being defined to likely cause interruption of the DA2GC data pathway; and
      initiate handoff of data communications from the DA2GC transceiver to the satellite communication transceiver at a time determined responsive to the information indicating timing of the upcoming weather event; or
   (B) identify remaining time to a predicted loss of the DA2GC data pathway based on a location of the aircraft along a flight route of aircraft that will become too distant for communications with any DA2GC ground station defined in a map of DA2GC ground stations residing in memory of the broadband communication system; and
      initiate handoff of data communications from the DA2GC transceiver to the satellite communication transceiver at least a threshold time before expiration of the remaining time, wherein the threshold time is defined based on at least a predicted amount of time required to complete operations for the handoff of data communications.

2. The broadband communication system of claim 1 for providing broadband communication services onboard the aircraft, wherein:
   the controller is further configured to initiate handoff from the satellite communication transceiver to the DA2GC transceiver based on the measurements of performance satisfying a satellite to DA2GC data pathway handoff rule, by operations comprising communicating a roaming request to a network node connected to the ground networks to initiate routing of data communications to the DA2GC transceiver of the aircraft through the DA2GC ground station and initiate termination of routing of data communications to the satellite communication transceiver of the aircraft through the satellite ground station; and the controller is further configured to initiate handoff from the DA2GC transceiver to the satellite communication transceiver based on the measurements of performance satisfying a DA2GC to satellite data pathway handoff rule, by operations comprising communicating another roaming request to the network node connected to the ground networks to initiate routing of data communications to the satellite communication transceiver of the aircraft through the satellite ground station and initiate termination of routing of data communications to the DA2GC transceiver of the aircraft through the DA2GC ground station.

3. The broadband communication system of claim 1 for providing broadband communication services onboard the aircraft, wherein the threshold value is defined based on latency between initiating and completing handoff of data communications from the satellite communication transceiver to the DA2GC transceiver.

4. A broadband communication system for providing broadband communication services onboard an aircraft, the broadband communication system comprising:
a satellite communication transceiver configured to communicate directly with a target satellite providing a satellite communication data pathway with a satellite ground station connected to ground networks;
a direct air-to-ground communication (DA2GC) transceiver configured to communicate directly with a DA2GC ground station providing an DA2GC data pathway with the ground networks; and
a controller configured to control handoff between the satellite communication transceiver and the DA2GC transceiver for data communications between the broadband communications system and the ground networks, based on performance of at least one of the satellite communication data pathway and the DA2GC data pathway,
wherein the controller is further configured to:
determine an elevation angle between the target satellite and a steerable antenna which is on a fuselage of the aircraft and connected to the satellite communication transceiver; and
initiate handoff of data communications from the satellite communication transceiver to the DA2GC transceiver based on the elevation angle becoming less than a threshold value.

5. The broadband communication system of claim 4 for providing broadband communication services onboard the aircraft, wherein the threshold value is defined based on latency between initiating and completing handoff of data communications from the satellite communication transceiver to the DA2GC transceiver.

6. A broadband communication system for providing broadband communication services onboard an aircraft, the broadband communication system comprising:
a satellite communication transceiver configured to communicate directly with a target satellite providing a satellite communication data pathway with a satellite ground station connected to ground networks;
a direct air-to-ground communication (DA2GC) transceiver configured to communicate directly with a DA2GC ground station providing an DA2GC data pathway with the ground networks; and
a controller configured to control handoff between the satellite communication transceiver and the DA2GC transceiver for data communications between the broadband communications system and the ground networks, based on performance of at least one of the satellite communication data pathway and the DA2GC data pathway,
wherein the controller is further configured to:
determine an elevation angle between the target satellite and a steerable antenna which is on a fuselage of the aircraft and connected to the satellite communication transceiver; and
based on the elevation angle becoming less than a threshold value, command the satellite communication transceiver to steer the steerable beam transmitted by the steerable antenna to be directed toward a secondary satellite which has been determined to be at a higher elevation angle relative to the steerable antenna.

7. The broadband communication system of claim 1 for providing broadband communication services onboard the aircraft, wherein the controller is further configured to:
receive a communication indicating a date and time for a planned service outage for maintenance of one of the target satellite, the satellite ground station, and the DA2GC ground station; and
initiate the handoff of data communications between the satellite communication transceiver and the DA2GC transceiver based on the date and time for the data communications to pass through one of the satellite communication data pathway and the DA2GC data pathway while bypassing the one of the target satellite, the satellite ground station, and the DA2GC ground station during the maintenance.

8. The broadband communication system of claim 1 for providing broadband communication services onboard the aircraft, wherein the controller is further configured to:
obtain information indicating an upcoming weather event along a flight path, the weather event being defined to likely cause interruption of the DA2GC data pathway;
initiate handoff of data communications from the DA2GC transceiver to the satellite communication transceiver at a time determined responsive to the information indicating timing of the upcoming weather event.

9. A broadband communication system for providing broadband communication services onboard an aircraft, the broadband communication system comprising:
a satellite communication transceiver configured to communicate directly with a target satellite providing a satellite communication data pathway with a satellite ground station connected to ground networks;
a direct air-to-ground communication (DA2GC) transceiver configured to communicate directly with a DA2GC ground station providing an DA2GC data pathway with the ground networks; and
a controller configured to control handoff between the satellite communication transceiver and the DA2GC transceiver for data communications between the broadband communications system and the ground networks, based on performance of at least one of the satellite communication data pathway and the DA2GC data pathway,
wherein the controller is further configured to:
obtain information indicating an upcoming weather event that is defined to likely cause interruption of the satellite communication data pathway; and
command the satellite communication transceiver to steer the steerable beam transmitted by the steerable antenna to be directed toward a secondary satellite which has been determined to be at a higher elevation angle relative to the steerable antenna than the target satellite.

10. A broadband communication system for providing broadband communication services onboard an aircraft, the broadband communication system comprising:
   a satellite communication transceiver configured to communicate directly with a target satellite providing a satellite communication data pathway with a satellite ground station connected to ground networks;
   a direct air-to-ground communication (DA2GC) transceiver configured to communicate directly with a DA2GC ground station providing an DA2GC data pathway with the ground networks; and
   a controller configured to control handoff between the satellite communication transceiver and the DA2GC transceiver for data communications between the broadband communications system and the ground networks, based on performance of at least one of the satellite communication data pathway and the DA2GC data pathway,
   wherein the controller is further configured to perform one of the following:
   (A) obtain communication link quality measurements of the satellite communication data pathway through the satellite communication transceiver; and
      initiate handoff of data communications from the satellite communication transceiver to the DA2GC transceiver responsive to the communication link quality measurements of the satellite communication data pathway degrading below a threshold defined by a satellite to DA2GC data pathway handoff rule;
   (B) obtain measurements of communication congestion in the satellite communication data pathway; and
      initiate handoff of data communications from the satellite communication transceiver to the DA2GC transceiver responsive to the communication congestion measurements of the satellite communication data pathway satisfying a satellite to DA2GC data pathway handoff rule; or
   (C) obtain measurements of communication latency in the satellite communication data pathway through the satellite communication transceiver; and
      initiate handoff of data communications from the satellite communication transceiver to the DA2GC transceiver responsive to the communication latency measurements of the satellite communication data pathway satisfying a satellite to DA2GC data pathway handoff rule.

11. The broadband communication system of claim 1 for providing broadband communication services onboard the aircraft, wherein the controller is further configured to:
   obtain measurements of communication congestion in the satellite communication data pathway; and
   initiate handoff of data communications from the satellite communication transceiver to the DA2GC transceiver responsive to the communication congestion measurements of the satellite communication data pathway satisfying a satellite to DA2GC data pathway handoff rule.

12. The broadband communication system of claim 11 for providing broadband communication services onboard the aircraft, wherein the controller is further configured to:
   obtain measurements of communication congestion in the DA2GC data pathway; and
   initiate handoff of data communications from the DA2GC transceiver to the satellite communication transceiver responsive to the communication congestion measurements of the DA2GC data pathway satisfying a DA2GC to satellite data pathway handoff rule.

13. The broadband communication system of claim 1 for providing broadband communication services onboard the aircraft, wherein the controller is further configured to:
   obtain measurements of communication latency in the satellite communication data pathway through the satellite communication transceiver; and
   initiate handoff of data communications from the satellite communication transceiver to the DA2GC transceiver responsive to the communication latency measurements of the satellite communication data pathway satisfying a satellite to DA2GC data pathway handoff rule.

14. The broadband communication system of claim 1 for providing broadband communication services onboard the aircraft, wherein the controller is further configured to:
   determine latency sensitivity of sessions for respective applications executed by at least one electronic device onboard the aircraft;
   route traffic in any of the sessions which have been determined to have latency sensitivity which satisfies a DA2GC data pathway rule, to the DA2GC transceiver for communication to the DA2GC ground station for relay through the ground networks; and
   route traffic in any of the sessions which have been determined to have latency sensitivity which does not satisfy the DA2GC data pathway rule, to the satellite communication transceiver for communication to the target satellite for relay through the satellite ground station and the ground networks.

15. The broadband communication system of claim 14, wherein the controller is further configured to:
   determine latency sensitivity of one of the sessions based on a destination IP address of a data packet sent as traffic through the session.

16. The broadband communication system of claim 14, wherein the controller is further configured to:
   determine latency sensitivity of one of the sessions based on a type of traffic being communicated as traffic through the session.

17. A broadband communication system for providing broadband communication services onboard an aircraft, the broadband communication system comprising:
   a satellite communication transceiver configured to communicate directly with a target satellite providing a satellite communication data pathway with a satellite ground station connected to ground networks;
   a direct air-to-ground communication (DA2GC) transceiver configured to communicate directly with a DA2GC ground station providing an DA2GC data pathway with the ground networks; and
   a controller configured to control handoff between the satellite communication transceiver and the DA2GC transceiver for data communications between the broadband communications system and the ground networks, based on performance of at least one of the satellite communication data pathway and the DA2GC data pathway,
   wherein the controller is further configured to:
   obtain metadata associated with applications;
   determine from the metadata whether traffic communicated with the application is preferred to be routed through the satellite communication data pathway or through the DA2GC data pathway;

when the metadata is determined to indicate a preference for traffic to be routed through the satellite communication data pathway, prioritize routing traffic being sent by the application to a ground-based network node to the satellite communication transceiver unless a DA2GC data pathway routing rule is satisfied by a condition of the satellite communication data pathway; and when the metadata is determined to indicate a preference for traffic to be routed through the DA2GC data pathway, prioritize routing traffic being sent by the application to the ground-based network node to the DA2GC transceiver unless a satellite data pathway routing rule is satisfied by a condition of the DA2GC data pathway.

18. The broadband communication system aboard an aircraft of claim 17, wherein the operation to determine from the metadata comprises determining one of a priority of the application and an indicated pathway preference for traffic sent by the application.

19. The broadband communication system of claim 1 for providing broadband communication services onboard the aircraft, wherein the controller is further configured to:
obtain customer information for a customer associated with an electronic device executing an application;
determine from the customer information whether traffic communicated with the application is preferred to be routed through the satellite communication data pathway or through the DA2GC data pathway;
when the customer information is determined to indicate a preference for traffic to be routed through the satellite communication data pathway, prioritize routing traffic being sent by the application to a ground-based network node to the satellite communication transceiver unless a DA2GC data pathway routing rule is satisfied by a condition of the satellite communication data pathway; and
when the customer information is determined to indicate a preference for traffic to be routed through the DA2GC data pathway, prioritize routing traffic being sent by the application to the ground-based network node to the DA2GC transceiver unless a satellite data pathway routing rule is satisfied by a condition of the DA2GC data pathway.

20. A broadband communication system for providing broadband communication services onboard an aircraft, the broadband communication system comprising:
a satellite communication transceiver configured to communicate directly with a target satellite providing a satellite communication data pathway with a satellite ground station connected to ground networks;
a direct air-to-ground communication (DA2GC) transceiver configured to communicate directly with a DA2GC ground station providing an DA2GC data pathway with the ground networks; and
a controller configured to control handoff between the satellite communication transceiver and the DA2GC transceiver for data communications between the broadband communications system and the ground networks, based on performance of at least one of the satellite communication data pathway and the DA2GC data pathway,
wherein the controller is further configured to:
obtain communication cost for the satellite communication data pathway based on location of the aircraft;
initiate handoff of data communications from the satellite communication transceiver to the DA2GC transceiver responsive to the communication cost for the satellite communication data pathway satisfying a satellite to DA2GC data pathway handoff rule; and
initiate handoff of data communications from the DA2GC transceiver to the satellite communication transceiver responsive to the communication cost for the satellite communication data pathway satisfying a DA2GC to satellite data pathway handoff rule.

21. The broadband communication system of claim 1 for providing broadband communication services onboard the aircraft, wherein the controller is further configured to:
identify remaining time to an predicted loss of the DA2GC data pathway based on a location of the aircraft along a flight route of aircraft that will become too distant for communications with any DA2GC ground station defined in a map of DA2GC ground stations residing in memory of the broadband communication system; and
initiate handoff of data communications from the DA2GC transceiver to the satellite communication transceiver at least a threshold time before expiration of the remaining time, wherein the threshold time is defined based on at least a predicted amount of time required to complete operations for the handoff of data communications.

22. The broadband communication system of claim 4 for providing broadband communication services onboard the aircraft, wherein the controller is further configured to:
determine a line-of-sight angle between the target satellite and the steerable antenna which is on the fuselage of the aircraft and connected to the satellite communication transceiver, wherein the line-of-sight angle includes the elevation angle;
determine based on the line-of-sight angle a risk of a tail of the aircraft causing attenuation of a steerable beam that is transmitted by the steerable antenna when transmitting through the satellite communication data pathway to the target satellite; and
initiate handoff of data communications from the satellite communication transceiver to the DA2GC transceiver based on the risk of the tail of the aircraft interfering with the steerable beam satisfying a threshold value.

23. The broadband communication system of claim 6 for providing broadband communication services onboard the aircraft, wherein the controller is further configured to:
determine a line-of-sight angle between the target satellite and the steerable antenna which is on the fuselage of the aircraft and connected to the satellite communication transceiver, wherein the line-of-sight angle includes the elevation angle;
determine based on the line-of-sight angle a risk of a tail of the aircraft causing attenuation of a steerable beam that is transmitted by the steerable antenna when transmitting through the satellite communication data pathway to the target satellite; and
based on the risk of the tail of the aircraft interfering with the steerable beam satisfying a threshold value, command the satellite communication transceiver to steer the steerable beam transmitted by the steerable antenna to be directed toward a secondary satellite which has been determined to be angularly offset from the target satellite with reduced risk of the tail causing attenuation of the steerable beam.

* * * * *